United States Patent [19]

Savegh et al.

[11] Patent Number: 5,182,785
[45] Date of Patent: Jan. 26, 1993

[54] HIGH-FLEX OPTICAL FIBER COIL CABLE

[75] Inventors: Emile G. Savegh, Austin; John E. Martinez, Port Arthur; Alfredo Cedrone, Austin, all of Tex.

[73] Assignee: W. L. Gore & Associates, Inc., Newark, Del.

[21] Appl. No.: 774,409

[22] Filed: Oct. 10, 1991

[51] Int. Cl.⁵ .......................... G02B 6/26; G02B 6/02
[52] U.S. Cl. .................................. 385/128; 385/141
[58] Field of Search ............... 385/100, 102, 123, 124, 385/126–128, 134, 141, 144, 145, 147

[56] References Cited

U.S. PATENT DOCUMENTS

| | | | |
|---|---|---|---|
| 3,817,595 | 6/1974 | Edelman et al. | 385/115 |
| 4,699,451 | 10/1987 | Mohr | 385/147 X |
| 4,741,594 | 5/1988 | Suzuki | 385/141 X |
| 4,852,964 | 8/1989 | Holland et al. | 385/111 |
| 4,883,337 | 11/1989 | Dahlgren | 385/134 |
| 5,002,359 | 3/1991 | Sayegh | 385/107 |

*Primary Examiner*—Akm E. Ullah
*Attorney, Agent, or Firm*—Gary A. Samuels

[57] ABSTRACT

A flexible coiled optical fiber cable having an expanded PTFE buffer layer and a high Durometer D hardness heat-settable jacket to provide a cable useful in high-flex environments.

9 Claims, 1 Drawing Sheet

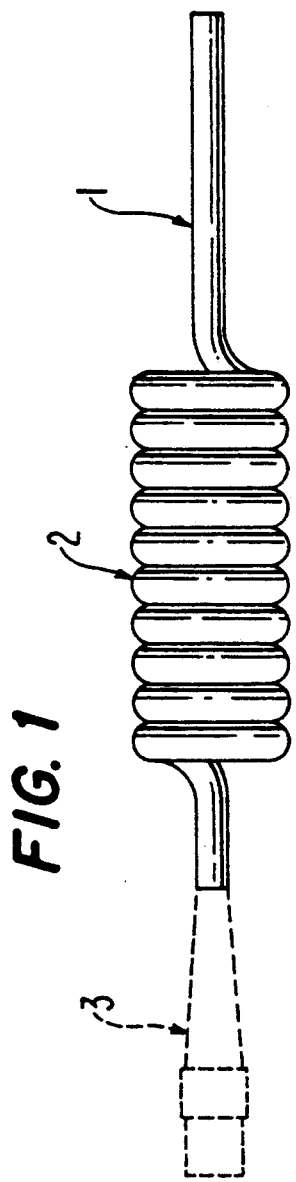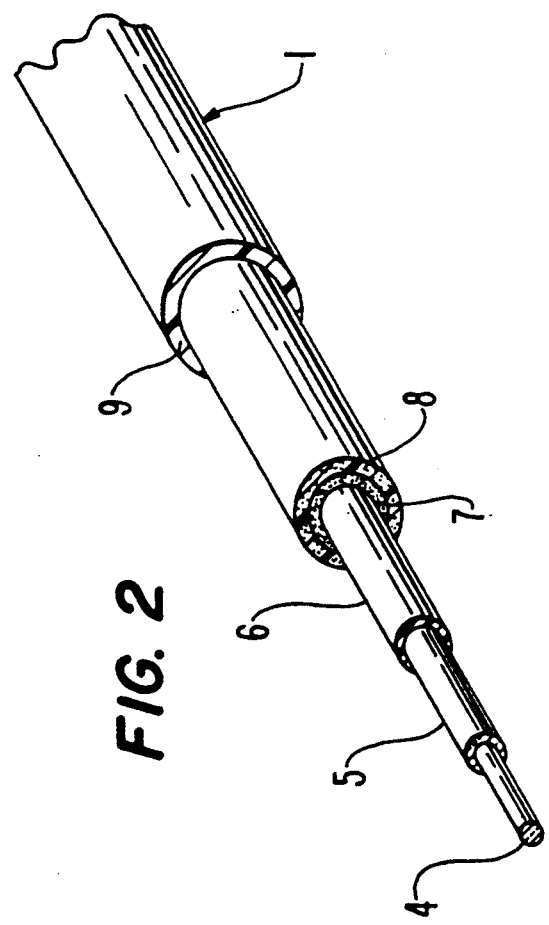

HIGH-FLEX OPTICAL FIBER COIL CABLE

FIELD OF THE INVENTION

This invention relates to optical waveguide fiber cables, particularly those in coil form which are flexed or increased or decreased in length during use.

BACKGROUND OF THE INVENTION

Optical waveguide fiber cables are presently used to connect moving parts of electronic equipment which require data transmission or exchange of information—carying signals between the moving parts. Such equipment as robots, high-speed printer heads, and any equipment that requires parts of it to be constantly or intermittently in motion are useful applications of such coiled cables.

In coiled optical waveguide fiber cables, the integrity of the signals transmitted by the fiber must be maintained while, at the same time, the fiber is being bent, the cable coils lengthened, shortened, or moved about in some way, often at a rapid rate.

Optical waveguide glass fibers are made from glass such as quartz glass or doped silica glass and are extremely small in diameter and hence weak in strength. Under normal conditions of use, such fibers may be subjected to considerable bending strain and tensile forces during the cable manufacturing process and while being pulled through ducts and otherwise bent, twisted, or manipulated during reeling or during installation. In the transmission of light signals through optical fiber cables, the signals are readily attenuated in response to relatively small distortions in the cable, such as those caused by the above stresses, sharp bends or roughness in the surface of the fiber to produce light signal distortions or attenuation at an unacceptable level.

To confine the optical signals inside the signal-transmitting fiber core, a glass or silica fiber core is coated with a glass cladding or an amorphous fluoropolymer coating always of a lower refractive index from that of the optical fiber. A coating is usually applied on top of the cladding. The coating on the glass cladding may optionally be a silicone, acrylic, polyimide, or other release agent and a polymer coating, which is usually a hard or soft polymer coating which is coated on the fiber from a melt or a solution of the polymer, or extruded onto the fiber. Many hard and soft plastic coatings have been tried and some of these have been applied in layers for varying purposes as disclosed in U.S.- Pat. Nos. 4,113,350, 4,105,284, 4,380,367, 4,072,400, 3,930,103, 4,463,329, 4,099,837, and 4,642,265, of which the background discussion contained therein is hereby incorporated into this application. Another excellent discussion of optical fiber packaging and buffering is provided by a paper in the Bell System Technical Journal in Volume 54, No. 2, pages 245-262. Feb. 1975, by D. Gloge.

Similar considerations apply to plastic optical fibers also.

Loss of light from a fiber can also be induced by bending the fiber. This is a very important loss mechanism, as the presence or absence of this loss mechanism is determined by the fiber user. Improper cabling may produce small systematic perturbations to the fiber, causing an elevation of the initial loss. These losses, caused by small-amplitude (nanometer), high-spatial-frequency (millimeter) perturbations are called microbending losses. Even if cabled correctly, the fiber can be installed in tight-diameter bends (e.g., centimeters in radius) that also will raise the attenuation. This large-diameter bend loss is referred to as macrobend loss.

Increasing overall fiber diameter also decreases sensitivity, whereas increasing core diameter increases sensitivity, since the fiber will have a greater modal volume and tend toward more lossy modes The physical basis for the loss in the fiber is that a bend will change the optical path length of the fiber. The light propagating at the inside of the bend will travel a shorter distance than that travelling on the outside of the bend. To maintain coherence, the mode phase velocity must increase. But when a fiber bend is below the critical radius, this propagation velocity will exceed the speed of light and some of the light within the fiber is converted to higher-order modes and becomes radiative. The loss of these higher-order modes causes a gradual increase in attenuation.

A low-modulus coating generally will improve the insensitivity to random bends. However, this low-modulus coating may not produce sufficient mechanical protection for industrial handling, and a secondary, higher-modulus coating often is applied if a secondary coating is not applied. The lower-modulus coating typically is applied to a greater thickness, i.e., several hundred micrometers.

As the bend radius is decreased, a radius is reached at which the primary mode is lost at a given wavelength. As the bend radius is further decreased, the bend edge shifts to still shorter wavelengths. Thus, in single-mode fibers, the loss is wavelength dependent.

The bend sensitivity changes with the degree of power confinement, which is determined by the difference between the operating wavelength and single-mode cutoff wavelength. As the difference between these two parameters is decreased, and as the single-mode cutoff wavelength is shifted toward longer wavelengths, the optical loss caused by fiber bends decreases.

Much effort has been spent in the past to protect optical fibers from breaking, microbending, vibrating, excessive bending, compression, and other forms of movement. This has often resulted in coating or wrapping the fiber in various forms of polymer and metal layers as discussed above in an attempt to protect the fiber so as to permit movement commensurate with the application in which it is desired in order to use it without at the same time degrading the signal carried by the fiber by continuous flexing of the cable.

One means of protecting the optical fiber against problems caused by movement has been to house the fiber loosely in a hollow tube which may be coiled to allow lengthening and shortening of the cable without applying torsional strain to the fiber. Such hollow tubes, however, tend to have low crush resistance. Hollow tubes also allow the fiber to have free radial motion which causes fatigue in flexure and increases the allowable bend radius of the fiber. There is also a problem of wear and abrasion of the coatings of the fiber against the walls of the tube. During stripping of a cable in the termination process, it is also easier to damage a fiber if it is located off-center in the loosely-fitting hollow tube. Being loose in the tube the fiber is subject to torsion without support while being held by the stripper mechanism.

The cable of the invention provides an improved solution to these problems.

SUMMARY OF THE INVENTION

The invention provides a coiled optical waveguide fiber cable comprising a clad optical fiber further coated with a polymer protective coating, for example, an acrylic or polyimide. Wrapped around the clad and coated fiber is at least two layers of porous expanded polytetrafluoroethylene (PTFE) tape, which is usually helically wound around the clad fiber. One side of the PTFE tape may be coated with an adhesive. The expanded PTFE tape has a low compression modulus, therefore the microbend loss is minimized. However, the expanded PTFE has a high tensile modulus, which helps in load sharing. Extruded around the PTFE tape layer is a jacket of high Durometer polymer which can be heat-set into a coil. The jacket has high tensile and compression modulus, gives external physical protection and load sharing, and will heat set. A glass or plastic optical fiber may be used. A preferred jacket material is a high-strength polyester polymer of about 30 mil thickness and about 20-100 Durometer D hardness, with the most preferred range being of about 83-85 Durometer D hardness. Each coil cable of the is expected to withstand over one and a half million flex cycles with minimal optical signal degradation.

BRIEF DESCRIPTION OF THE DRAWINGS

FIG. 1 is a side view of a coiled cable of the invention shown retracted and with a sample connector dotted in as attached to one end.

FIG. 2 is a partial perspective view of a cable of the invention with successive layers partially peeled away for easy viewing of the structure of the cable.

DESCRIPTION OF THE INVENTION

The invention is now described in detail with reference to the drawings to more carefully delineate the elements of and materials and processes used in the invention.

FIG. 1 shows in a side view a coiled form of the optical fiber cable 1 of the invention. The retracted coils 2 provide extensibility to the cable without excessive bending or terminal forces being applied to the optical fiber therein during normal manufacture, termination, installation, or use of the cable. An optical connector 3 is shown in dotted presentation to show a typical terminated cable. Standard connectors known in the art for terminating plastic or glass optical fibers may be used to terminate the cable of the invention.

FIG. 2 is a perspective view of a cable of the invention with the various layers partially peeled off to better show how the layers are arranged within the cable.

An optical glass fiber 4 is shown surrounded by cladding 5. Fiber 4 may alternatively be a plastic fiber of a composition known in the art for such purposes, such as polymethylmethacrylate or styrene. Cladding 5 is a glass or silica of a lower refractive index than fiber 4 or may be a plastic, such as an acrylic polymer. A preferred fiber is a glass-clad glass fiber coated with an acrylic or polyimide polymer protective layer 6. Layer 7 comprises an adhesive material shown coated in FIG. 2 on one side of an expanded PTFE tape 8. The adhesive can be polyester, fluorinated ethylene-propylene copolymer (FEP), a silicone containing polyurethane polymer, such as Siltem ® (General Electric Co.), or a perfluoroalkyl vinyl ether copolymer with PTFE. A polyester adhesive is preferred. The PTFE tape 8 is helically-wrapped around the protective layer 6 to give at least two layers of tape to decouple the optical fiber from the remainder of the cable against outside forces applied to the cable.

A high Durometer D hardness jacket 9 surrounds PTFE layer 8. Jacket 9 may be any high Durometer D hardness polymer, but is preferably a high-strength high Durometer D hardness polyester, such as Hytrel ® (DuPont de Nemours and Co.). The preferred hardness range for jacket 9 is 70-100 Durometer D hardness, preferably 80-90, the most preferred range being about 83-85, as determined by ASTM Method D2240-86.

The jacketed cable is heat-set into a coil by coiling the cable into a desired coiled form and heating for a time at about 120° F., then cooling. Instead of polyester one could use as the jacket a polyamide or polyurethane polymer which must be either heat-setable or possess elastic memory so that it will hold the coil shape when once the coil is formed.

The cables of the invention may also be useful bundled with other heat-setable jacketed cables, both electrical and optical fiber, within a large round cable or hybrid cable or the outer jacket may be heat setable and no jacket surrounds the individual cables.

The cables of the invention have low induced optical loss owing the expanded PTFE layer acting as a thermal buffer during manufacture of the cable, particularly during heat-setting the jacket. The expanded PTFE layer provides for the cable a good extension to retraction ratio owing to the absorption of mechanical stresses by that layer during extension. A cable of the invention has been flexed 1-1.5 million times with minimum optical degradation and has high crush resistance as well on the order of several orders of magnitude higher than a loose tube buffered cable as measured by signal attenuation change (dB/km) with compressive load (Newtons). The cables are highly advantageous in high-flex environments where a coiled package, signal density, and optical integrity are critical to overall system performance, such as robotics, instrumentation, and medical electronics. The cable has a low fluctuation of power level between the extruded and retracted positions on the order of 0.2 db for a coil with a multimode fiber and 0.1 db for a coil with a single mode fiber.

The porous expanded PTFE comprising a part of the cable of the invention is described in U.S. Pat. Nos. 3,953,566, 3,962,153, 4,096,227, 4,187,390, 4,478,665 and 4,902,423, assigned to W. L. Gore & Associates, Inc.

We claim:

1. A coiled flexible optical fiber cable comprising:
    (a) a clad optical fiber coated with a protective polymer coating;
    (b) wrapped around said coated clad fiber at least two layers of porous expanded polytetrafluoroethylene tape; and
    (c) around said expanded polytetrafluoroethylene tape layers a heat-set high Durometer D hardness jacket.

2. A cable of claim 1 wherein said fiber comprises a glass fiber clad with a silica or glass cladding having a lower refractive index than said glass fiber.

3. A cable of claim 1 wherein said fiber is plastic.

4. A cable of claim 1 wherein said protective polymer coating comprises an acrylic polymer or a polyimide polymer.

5. A cable of claim 1 wherein said jacket comprises polyester.

6. A cable of claim 1 or 5 wherein the Durometer D hardness of said jacket is about 70 to 100.

7. A cable of claim 1 or 5 wherein the Durometer D hardness of said jacket is about 80-90.

8. A cable of claim 1 wherein said layers of polytetrafluoroethylene tape are coated on one side with an adhesive.

9. A cable of claim 8 wherein said adhesive is selected from the group consisting of polyester, fluorinated ethylene-propylene copolymers, silicone-group containing polyurethanes, and perfluoroalkyl vinyl ether copolymers with tetrafluoroethylene.

* * * * *